United States Patent

Spycher

[11] 4,227,950
[45] Oct. 14, 1980

[54] DIRECT CASTING METHOD FOR PRODUCING LOW-STRESS GLASS/PLASTIC COMPOSITE LENSES

[75] Inventor: Anton A. Spycher, Big Flats, N.Y.

[73] Assignee: Corning Glass Works, Corning, N.Y.

[21] Appl. No.: 27,231

[22] Filed: Apr. 5, 1979

Related U.S. Application Data

[63] Continuation of Ser. No. 848,442, Nov. 4, 1977, abandoned.

[51] Int. Cl.² .................. B29D 11/00; B32B 31/06
[52] U.S. Cl. .................. 156/85; 156/99; 156/102; 156/106; 156/242; 264/1; 264/299; 350/178; 350/320; 351/166
[58] Field of Search .................. 156/84, 85, 99, 102, 156/106, 246, 242; 264/1, 212, 216, 299, 308, 319; 350/178, 320; 351/166

[56] References Cited

U.S. PATENT DOCUMENTS

| | | | |
|---|---|---|---|
| 2,047,253 | 7/1936 | Brooks | 351/166 |
| 2,976,197 | 3/1961 | Cox | 156/102 |
| 3,135,645 | 6/1964 | Berkley et al. | 351/166 |
| 3,987,449 | 10/1976 | DeAngelis et al. | 156/99 |

OTHER PUBLICATIONS

IBM Technical Disclosure Bulletin "Reducing the Shrinkage of Resins During Curing", vol. 12, No. 4.

*Primary Examiner*—Caleb Weston
*Attorney, Agent, or Firm*—Kees van der Sterre; Clinton S. Janes, Jr.

[57] ABSTRACT

A glass-plastic composite lens combining a glass element with a high-shrinkage thermosetting plastic is provided in accordance with a direct casting process comprising a consolidation heating step, subsequent to plastic curing and shrinkage, during which a thermoplastic coating between the glass element and the cured plastic bonds the assembly into a unitary low-stress composite.

4 Claims, 3 Drawing Figures

DIRECT CASTING METHOD FOR PRODUCING LOW-STRESS GLASS/PLASTIC COMPOSITE LENSES

This is a continuation, of application Ser. No. 848,442, filed Nov. 4, 1977, abandoned.

BACKGROUND OF THE INVENTION

The present invention generally relates to the production of composite glass-plastic articles, and is particularly concerned with a process for the manufacture of optically clear composites of laminated structure for a variety of applications.

The advantages of combining the light weight of clear plastics with the scratch resistance and chemical durability of glass have long been recognized. U.S. Pat. No. 2,361,589 to Bennett et al., for example, describes durable, lightweight lenses formed by laminating thin glass sheets to the exterior of plastic lenses.

Although composite products exhibiting the desired physical properties can be produced by lamination methods, the direct molding or casting of such composites is more efficient and thus more attractive from the commercial point of view. One procedure for adapting such direct methods to the manufacture of optical composites is described by Coenen in German Patentschrift 1,529,861.

Among the optically clear plastics suitable for use in composites of this type are certain thermosetting plastics exhibiting high shrinkage on curing. Examples of such plastics are epoxy and allyl carbonate plastics. As suggested in U.S. Pat. No. 3,382,137 to Schreiber et al., curing shrinkage such as is exhibited by plastics of this type can generate very high stresses in direct-cast glass-plastic composite articles.

The minimization of such stresses can be important for optical applications. For example, in the case of the plastic-plastic polarizing lenses described in U.S. Pat. No. 3,970,362 to Laliberte, excess stress was found to introduce birefringence into the lenses. Careful positioning of the polarizing plastic element within the optical plastic lens body was therefore specified in order to minimize the optical affects of any residual stress.

Stress is also a problem in the case of cast glass-plastic lenses having, for example, only a front surface protected by a thin glass element. In this configuration, shrinkage of the plastic during curing can cause deformation of the lens and cracking of the protective glass.

Some thermosetting plastics generate only moderate stress during shrinkage, and then fail due to plastic cracking prior to full curing. In cast glass-plastic composites produced from these plastics, locally adhering plastic areas bounded by a network of cracks in the plastic are usually produced. Of course such composites are useless for optical applications.

It is a principal object of the present invention to provide a direct casting method for producing composite glass-plastic articles wherein residual stresses attributable to shrinkage of the cast plastic are eliminated.

It is a further object of the invention to provide a direct casting method which can be used for the manufacture of glass-surfaced plastic lenses exhibiting low residual stress.

Other objects and advantages of the invention will become apparent from the following description.

SUMMARY OF THE INVENTION

In accordance with the invention, a cast glass-plastic article comprising at least one glass element indirectly bonded to a cast-in-place high-shrinkage thermosettting plastic element is provided by a method which includes a consolidation heating step subsequent to the step of curing the thermosetting plastic element of the article. A thermoplastic adhesive coating provided between the glass and plastic elements acts to control stress in the composite arising from curing shrinkage and to finally bond the glass and cured plastic elements together during consolidation. Through the use of this method, glass-plastic composites comprising low curing strength plastics and/or thin glass elements surrounding or encased in plastic may be provided.

The method of the invention specifically comprises the initial step of coating selected portions of the glass element to be incorporated into the composite with a thermoplastic coating which can act as an adhesive. The surface portions coated are those against which the thermosetting plastic selected for the plastic element of the composite is to be cast.

It is desirable to select for the coating a thermoplastic adhesive having a heat sealing temperature above the minimum curing temperature of the thermosetting plastic which is selected. Such an adhesive remains in a relatively solid, nonreactive state during the curing the thermosetting plastic, preventing undesirable chemical interactions and minimizing bonding and stress buildup between the plastic and the adhesive.

After selected surface portions of the glass element have been coated, the selected thermosetting plastic in liquid form is cast against the coated surface portions of the glass, and the liquid plastic is then cured by heating the glass, plastic and coating to a temperature below the heat sealing temperature of the thermoplastic adhesive but above the minimum curing temperature of the thermosetting plastic. During this step, the plastic may be held in place against the coated glass by gravity or using conventional mold elements, gaskets and the like.

After the thermosetting plastic has been cured, the glass element, thermoplastic adhesive, and cured thermosetting plastic element are further heated to a temperature above the heat sealing temperature of the thermoplastic adhesive to finally bond the cured plastic element to the adhesive-coated glass element. During this consolidation heating step, the softened thermoplastic adhesive can also release any stress generated between the glass and plastic due to curing shrinkage, thus providing an essentially stress-free glass-plastic composite article.

After consolidation has been completed, the composite article is cooled to ambient temperature. Differences in thermal expansion between the glass and plastic elements give rise to some stress in the composite as it is cooled; however, these stresses are low and thus to not ordinarily affect the physical or optical properties of the composite.

DESCRIPTION OF THE DRAWINGS

The invention may be further understood by reference to the drawings, wherein.

DETAILED DESCRIPTION

The method of the present invention is particularly useful for the production of optical elements such as lightweight glass-plastic lenses. Although the configuration of glass elements for such lenses may vary, the elements are typically quite thin (e.g., of a thickness up to about 0.020 inches). They may also be spherically and/or cylindrically curved, with the degree of curvature having a direct effect upon the refracting characteristics of the lenses. Nevertheless, through the proper selection of a thermoplastic coating material, the curvature characteristics of the glass element may be fully reproduced in the composite even when plastics exhibiting very high shrinkage upon curing are employed.

For applications such as lenses, it is important to use an optically clear thermoplastic adhesive to provide the thermoplastic coating on the surface of the glass element. Although the thickness of the coating is not critical, the thermoplastic must be one which can be conveniently applied in uniform thickness in order to avoid optical distortion in the product.

An example of a thermoplastic adhesive with desirable optical properties and good stress-release and heat sealing characteristics is polyvinyl butryral. Coatings of this thermoplastic may be conveniently provided on glass using plastic sheets, or by coating the glass with a solution of polyvinyl butyral in a suitable solvent by dipping, spraying, brushing, spinning or the like. Polyvinyl butryal also has a heating sealing temperature sufficiently high to remain essentially non-adhesive at the curing temperatures of several optical-quality, high-shrinkage thermosetting plastics. For the purpose of the present description, the heat sealing temperature is that temperature at which the thermoplastic becomes soft and/or reactive enough to bond to the thermosetting plastic.

Among the thermosetting plastics with very desirable optical properties for lens applications are the allyl diglycol carbonate plastics, e.g., a plastic produced from diethylene glycol bis(allyl carbonate) resin. This resin, commercially available and commonly known as CR-39 ® resin, typically exhibits a shrinkage on curing of about 14% by volume. It has a minimum curing temperature of about 70° C. (for soft cure), and is ordinarily heated to a peak curing temperature of 95° C. to complete the curing process and to provide a hard, strong plastic element.

Figure 1:
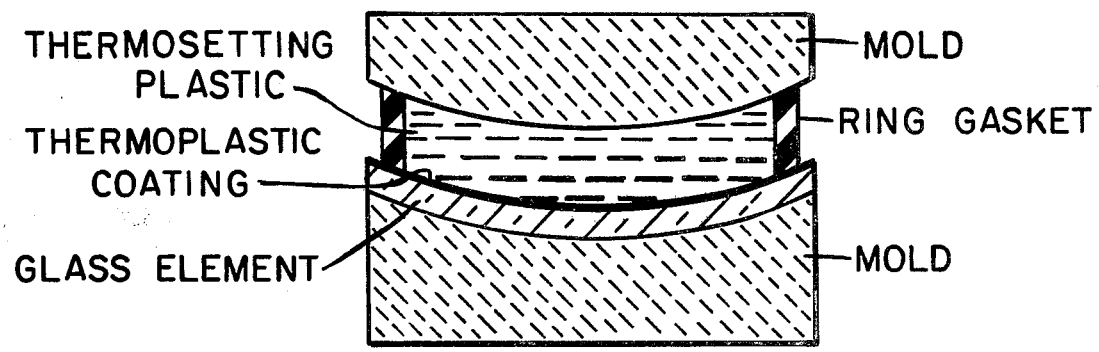
FIG. 1 is a schematic elevational view in cross-section of one type of cast glass-plastic composite article provided in accordance with the invention, together with mold and gasket elements utilized during the casting of the article.

The casting of the thermosetting plastic against a coated glass element is satisfactorily accomplished using the coated glass together with supplemental mold and gasket members to form a cavity into which the plastic in liquid form is poured or injected. One assembly suitable for this purpose is illustrated in FIG. 1 of the drawing, which shows a thermosetting-plastic-filled cavity defined by a mold, a ring gasket, and a curved sheet glass element having an interior thermoplastic coating. The curved sheet glass element is in turn supported by a second mold.

No special heating procedures are required for curing the thermosetting plastic while in contact with the coated glass. Thus in a case where a diethylene glycol bis(allyl carbonate) resin is injected into the cavity, the filled mold assembly is placed in a curing oven and heated according to a time/temperature schedule conventional for the curing of such a resin.

Figure 2:
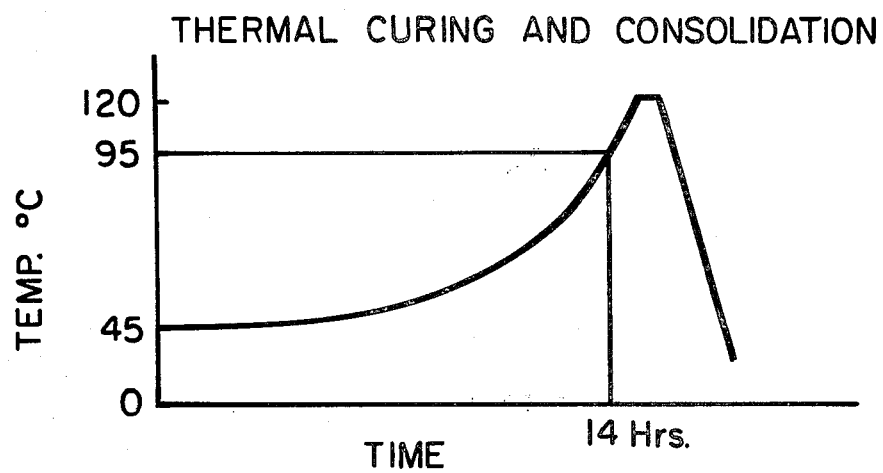
FIG. 2 is a graph of treating temperature versus time as a composite glass-plastic article is cycled through illustrative plastic curing and consolidation heating steps of the method of the invention.

One example of a suitable curing schedule, shown in FIG. 2 of the drawing, comprises slow heating to a curing temperature of 95° C. over a time interval of 14 hours, after which the resin is essentially completely polymerized to a hard clear plastic element. The schedule shown is for a 4 mm-thick CR-39 ® plastic element combined with a polyvinyl butyral thermoplastic coating having a heat sealing temperature above the maximum plastic curing temperature of 95° C.

During the consolidation step which immediately follows the curing step, the cured plastic element, glass element and thermoplastic coating are consolidated by briefly heating them above the heat sealing temperature of the thermoplastic coating. This step is illustrated in FIG. 2 of the drawing for the case of a polyvinyl butyral coating having a heat sealing temperature of about 120° C.

Figure 3:
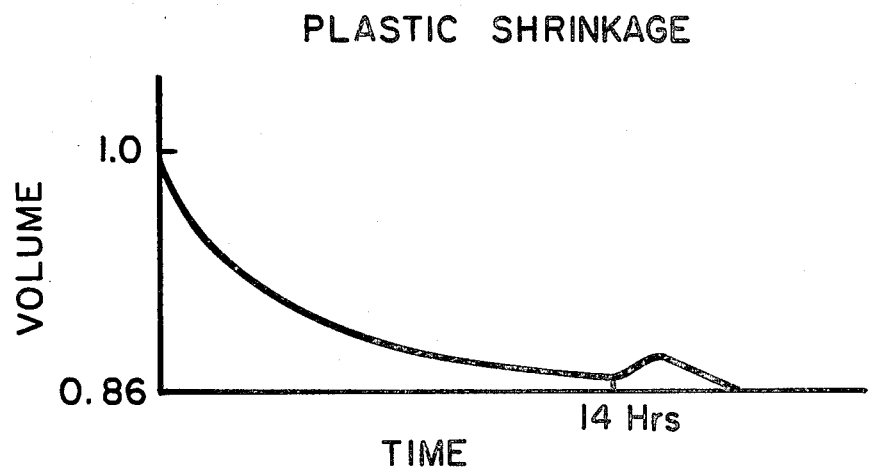
FIG. 3 is a graph of plastic shrinkage versus time during the plastic curing and stress-release heating steps shown in FIG. 2.

At temperatures below its heat sealing point, the polyvinyl butyral thermoplastic coating does not bond well to allyl diglycol carbonate plastic, so that stresses due to plastic shrinkage are largely avoided. Such shrinkage can be substantial, as exemplified by the 14% curing shrinkage illustrated in FIG. 3 of the drawing for a thermosetting allyl diglycol carbonate resin cured in accordance with the curing schedule of FIG. 2.

At heat sealing temperatures, the soft polyvinyl butyral layer can flow to relieve any residual stress and permanently bond the assembly into an integral glass-plastic composite article. The only stress then present in the composite as it is finally cooled to ambient temperature is that arising out of the differences in thermal expansion between the glass and plastic elements at temperatures below the softening temperature of the thermoplastic layer.

The invention may be further understood by reference to the following detailed examples illustrating some preferred procedures for the production of composite lenses in accordance therewith.

EXAMPLE A

A glass element for a glass-plastic composite lens, consisting of a round, spherically-curved glass disc about 0.010 inches in thickness, having a diameter of 70 mm and a surface curvature of 6.25 diopters, is thoroughly cleaned with acetone, dionized water and alcohol. A solution of polyvinyl butyral is prepared consisting of 10 parts plastic solids and 90 parts solvent by weight. The solids component of the solution consists of 60% by weight of Butvar B-98 polyvinyl butyral powder, available from the Monsanto Company, and 40% by weight of 3GH plasticizer, available from the Union Carbide Corporation. The solvent component of the solution consists of 22.5% diacetone alcohol, 22.5% n-butyl alcohol, 10% ethyl alcohol and 45% xylene by volume.

The polyvinyl butyral solution thus prepared is sprayed onto the concave surface of the curved glass lens element and dried until a solid thermoplastic layer about 0.005 inches thick is formed. The convex (uncoated surface) of the glass is then placed directly against a curved glass-ceramic supporting mold, a thermoplastic rubber ring gasket about 4 mm in thickness and having an inside diameter of about 60 mm is placed on the coated surface of the glass, and the open cavity thus provided is filled with prepolymerized CR-39 ® thermosetting resin. The convex surface of a second curved glass-ceramic mold is then placed over the resin and plastic gasket to form a closed cavity, substantially as shown in FIG. 1 of the drawing.

This filled mold assembly is clamped, placed in a curing oven, and heated in accordance with the heating schedule shown in FIG. 2 of the drawing, that heating schedule comprising controlled heating to 95° C. over a 14 hour interval to cure the CR-39 ® resin to a hard plastic, followed by heating to 120° C. for 10 minutes to heat-seal the cured plastic to the polyvinyl butyral coating. Finally the mold assembly is cooled to room temperature.

The mold assembly is opened and the consolidated composite lens removed and examined. The lens is of optical quality, free of glass and plastic defects, and the curvature of the front (glass-clad) surface of the lens substantially conforms to the 6.25 diopter curvature of the glass lens element used in fabrication.

EXAMPLE B

A glass lens element having a size and configuration essentially identical to the lens element described in Example A above is cleaned and positioned in a concave glass-ceramic supporting mold as therein described. A clean sheet of thermoplastic polyvinyl butyral, consisting of a section of 10 mil-thick Saflex SR-10 polyvinyl butyral film from the Monsanto Co., is placed over the glass element, covered with a thin sheet of polyethylene terepthalate acting as a release layer, and finally covered with a 10-lb. weight having a curvature matching that of the supporting mold and glass lens element.

This assembly is placed in a vacuum oven and heated at 120° C. under a partial vacuum (28 inches of mercury) to remove trapped air from the assembly and to preliminarily bond the polyvinyl butyral sheet to the glass lens element. It is then taken out of the vacuum oven and the weight and polyethylene terepthalate sheet are removed from the glass-thermoplastic sub-assembly.

This sub-assembly is then gasketed, filled with thermosetting CR-39 ® resin, covered with a curved glass-ceramic mold, clamped, and thermally processed to achieve plastic curing and consolidation of the glass and plastic lens elements in accordance with the procedure described in Example A above. The composite lens produced by this process is again of optical quality, free of glass and plastic defects and having a front surface curvature corresponding to the initial curvaure of the glass element used to form the front surface of the lens.

Of course, the foregoing examples are merely illustrative of procedures by which glass-plastic composite articles may be provided in accordance with the invention. Obviously, various other processing techniques may be resorted to the fabricating lenses and other composite glass-plastic articles within the scope of the appended claims.

I clam:

1. A direct casting method for producing an optically clear, optical-distortion-free composite lens comprising a glass element bonded to a high-shrinkage thermosetting plastic element, with low residual stress between the glass and plastic elements, which comprises the steps of:
   (a) providing selected surface portions of the glass element with a solid coating of a thermoplastic adhesive having a heat sealing temperature above the minimum curing temperature of the thermosetting plastic, said coating being solid, of uniform thickness, and essentially non-adhesive with respect to said thermosetting plastic at a curing temperature for said thermosetting plastic;
   (b) casting the thermosetting plastic in liquid form against the surface portions of the glass element which have been provided with the coating of thermoplastic adhesive while maintaning the uniform thickness and solid character of said coating of thermoplastic adhesive;
   (c) curing the thermosetting plastic by heating the plastic, the glass element and the coating of thermoplastic adhesive to a temperature below the heat sealing temperature of the thermoplastic adhesive but above the minimum curing temperature of the thermosetting plastic; and
   (d) consolidating the cured thermosetting plastic, thermoplastic adhesive, and glass element to a unitary glass-plastic composite by heating them to a temperature above the heat sealing temperature of the thermoplastic adhesive.

2. A method in accordance with claim 1 wherein the glass element has a thickness not exceeding about 0.020 inches.

3. A method in accordance with claim 1 wherein the thermoplastic adhesive consists of polyvinyl butyral.

4. A method in accordance with claim 1 wherein the high-shrinkage thermosetting plastic is an allyl diglycol carbonate plastic.

* * * * *